Figure 1:
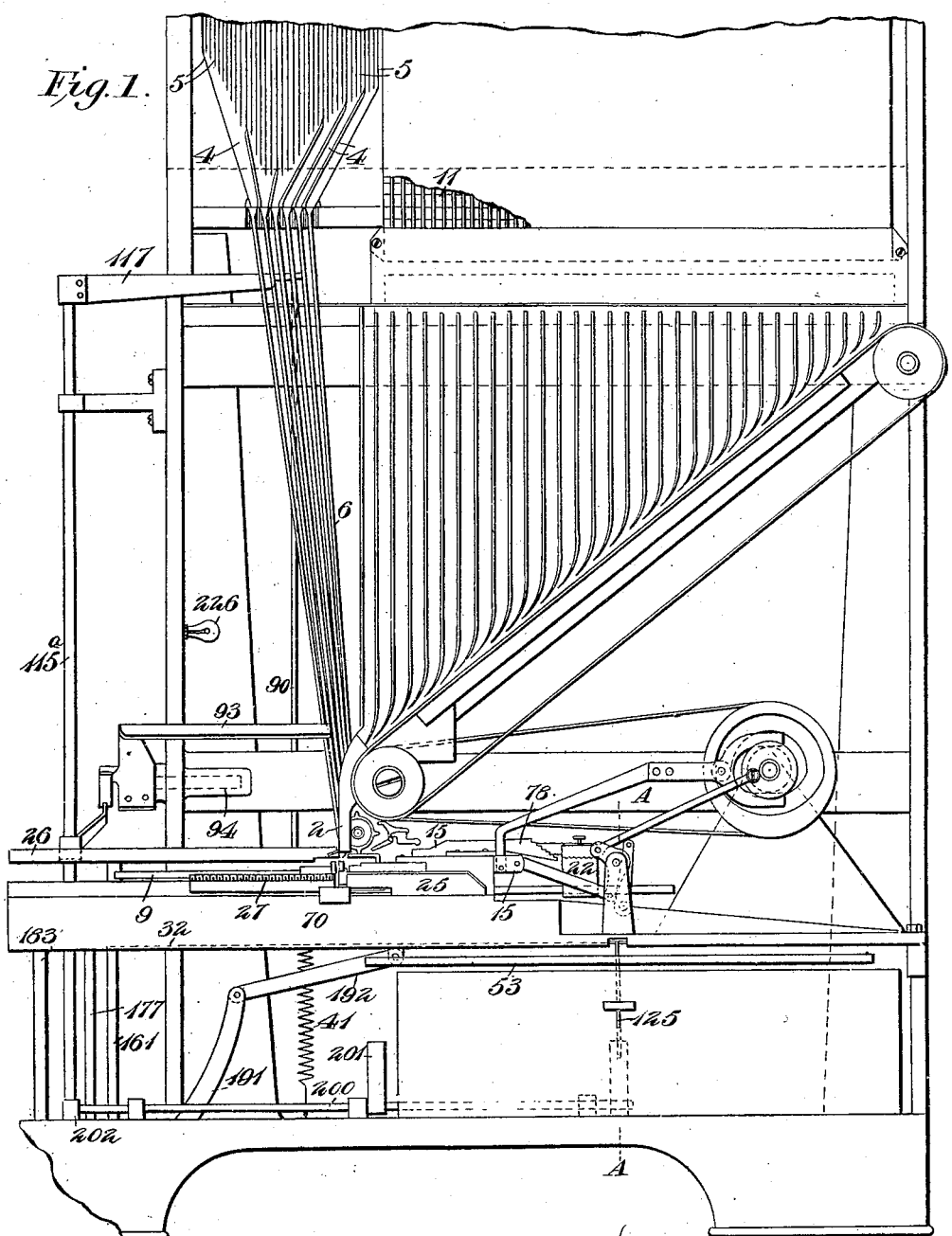

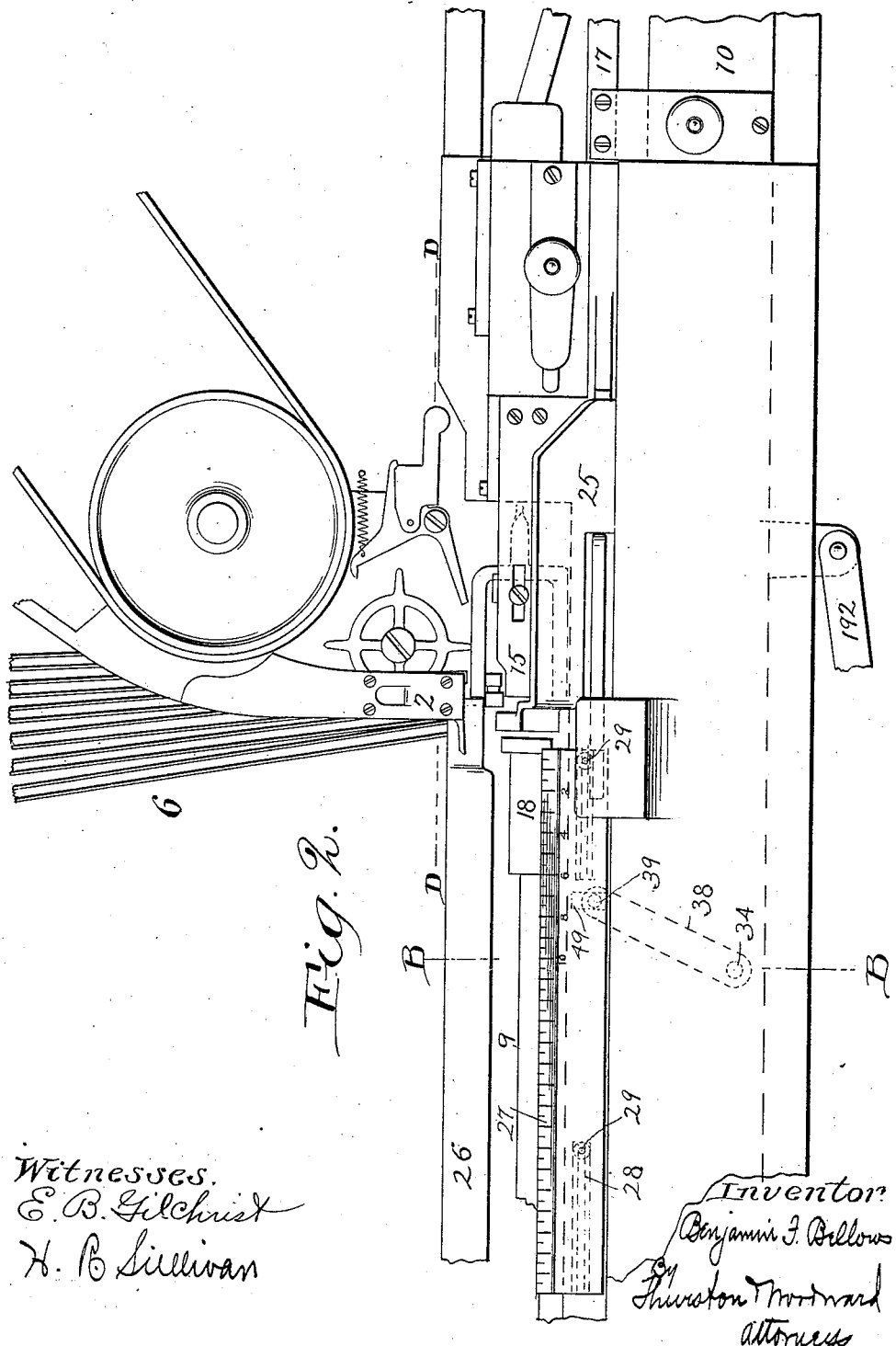

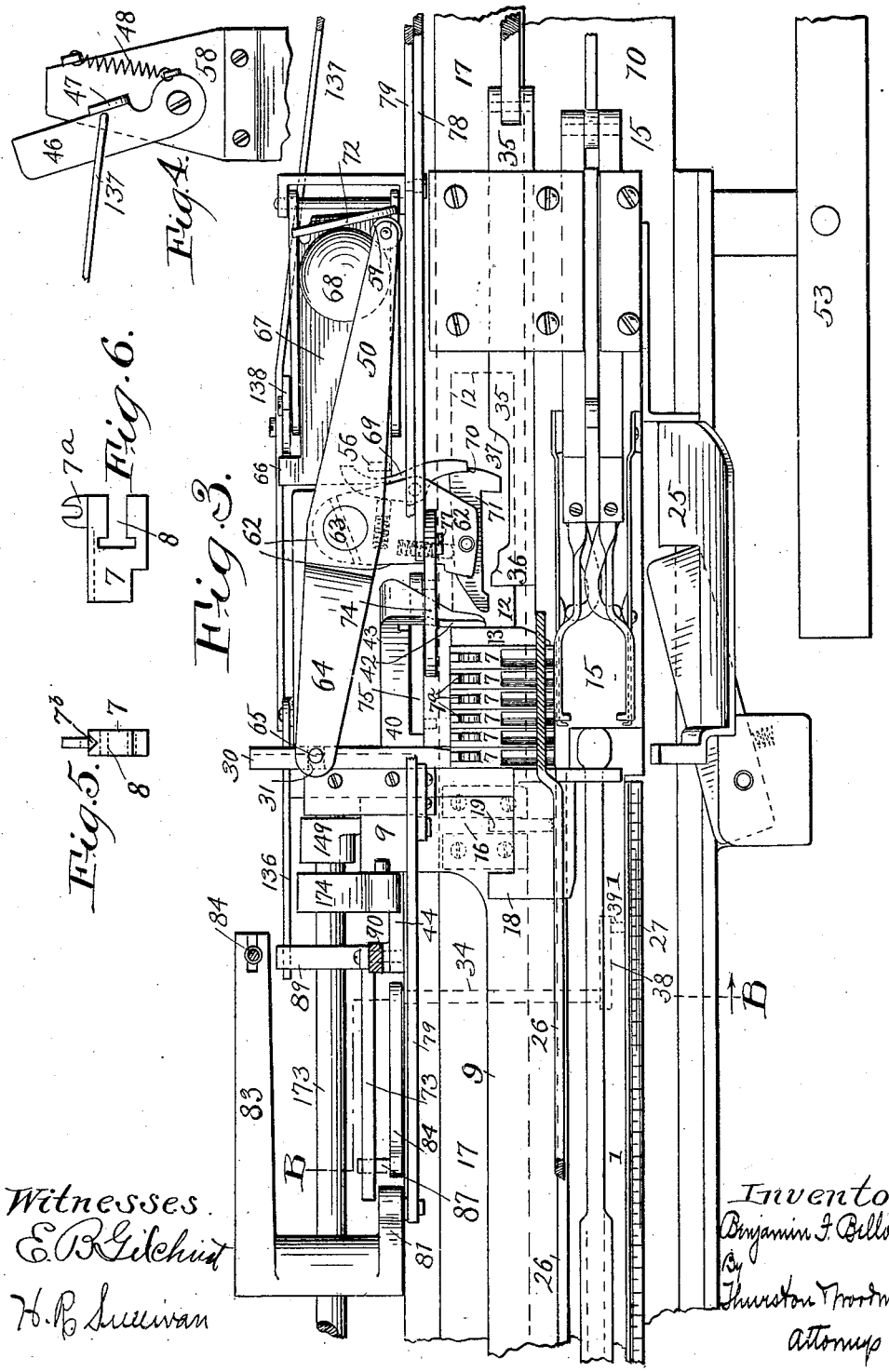

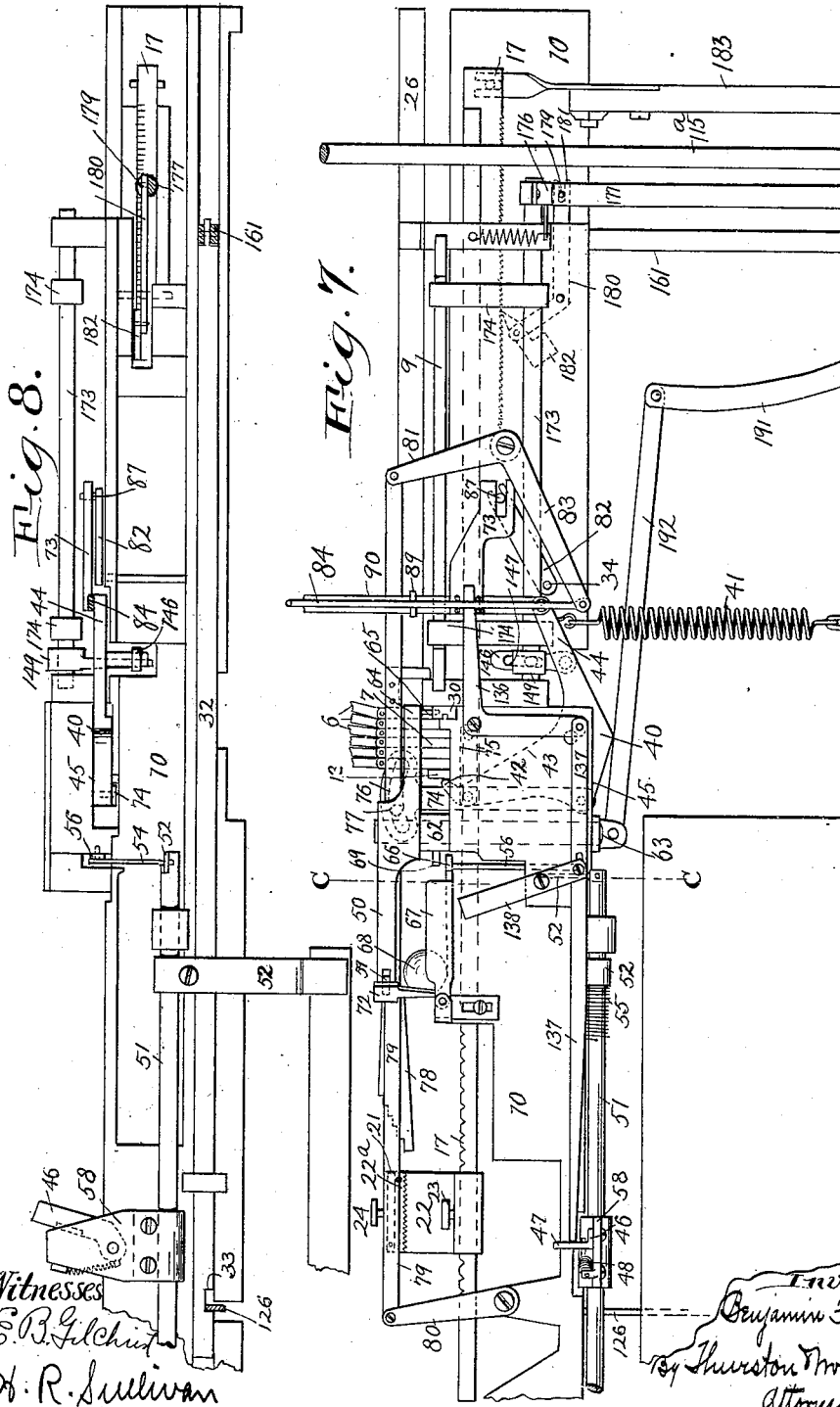

B. F. BELLOWS.
JUSTIFYING MECHANISM.
APPLICATION FILED AUG. 15, 1906.

921,063.

Patented May 11, 1909.
10 SHEETS—SHEET 5.

Witnesses
E. B. Gilchrist
H. B. Sullivan

Inventor
Benjamin F. Bellows
By
Thurston Woodward
Attorney

B. F. BELLOWS.
JUSTIFYING MECHANISM.
APPLICATION FILED AUG. 15, 1906.

921,063.

Patented May 11, 1909.
10 SHEETS—SHEET 7.

Witnesses
E. B. Gilchrist
H. B. Sullivan

Inventor
Benjamin F. Bellows
Thurston Woodward
Attorney

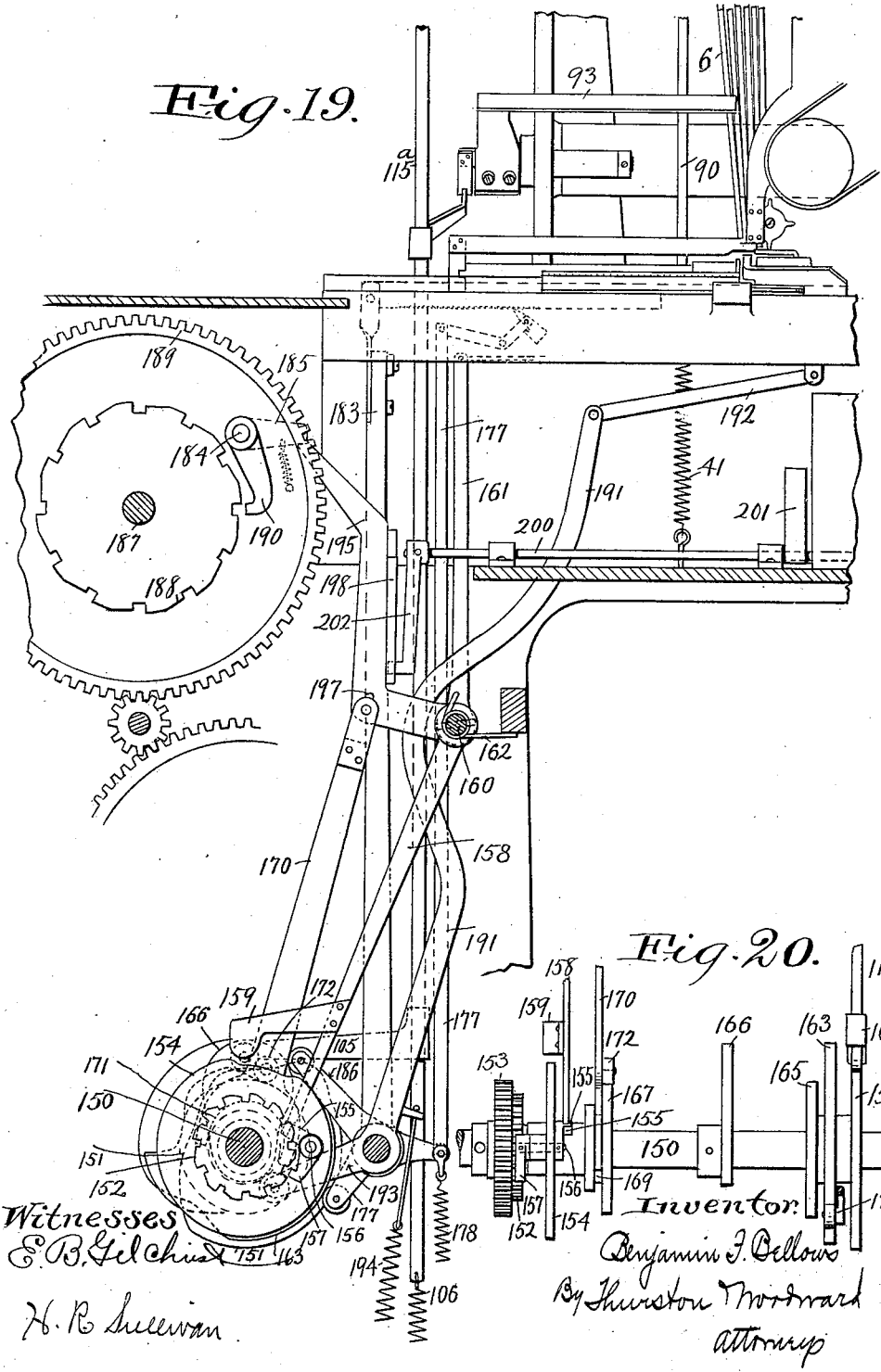

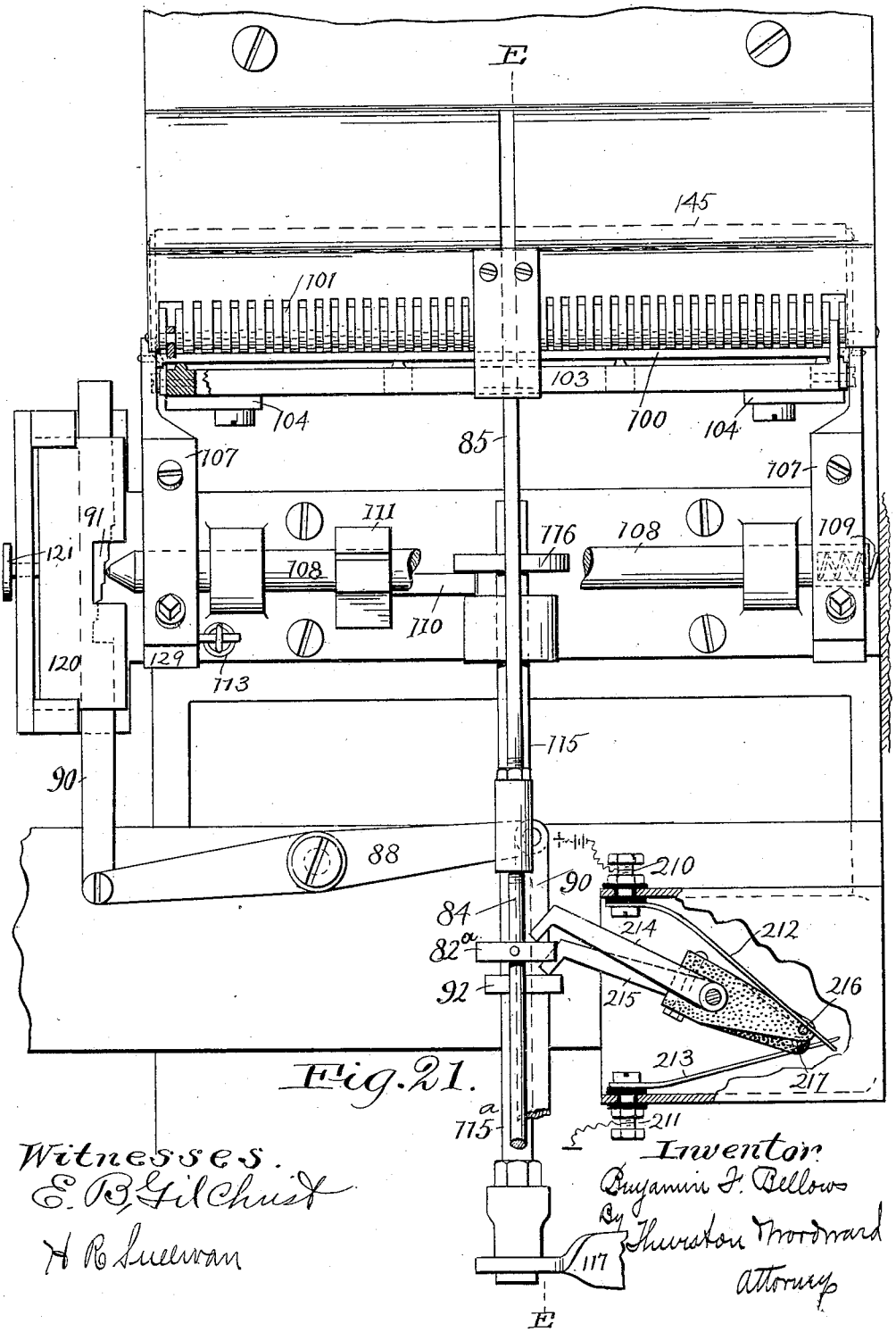

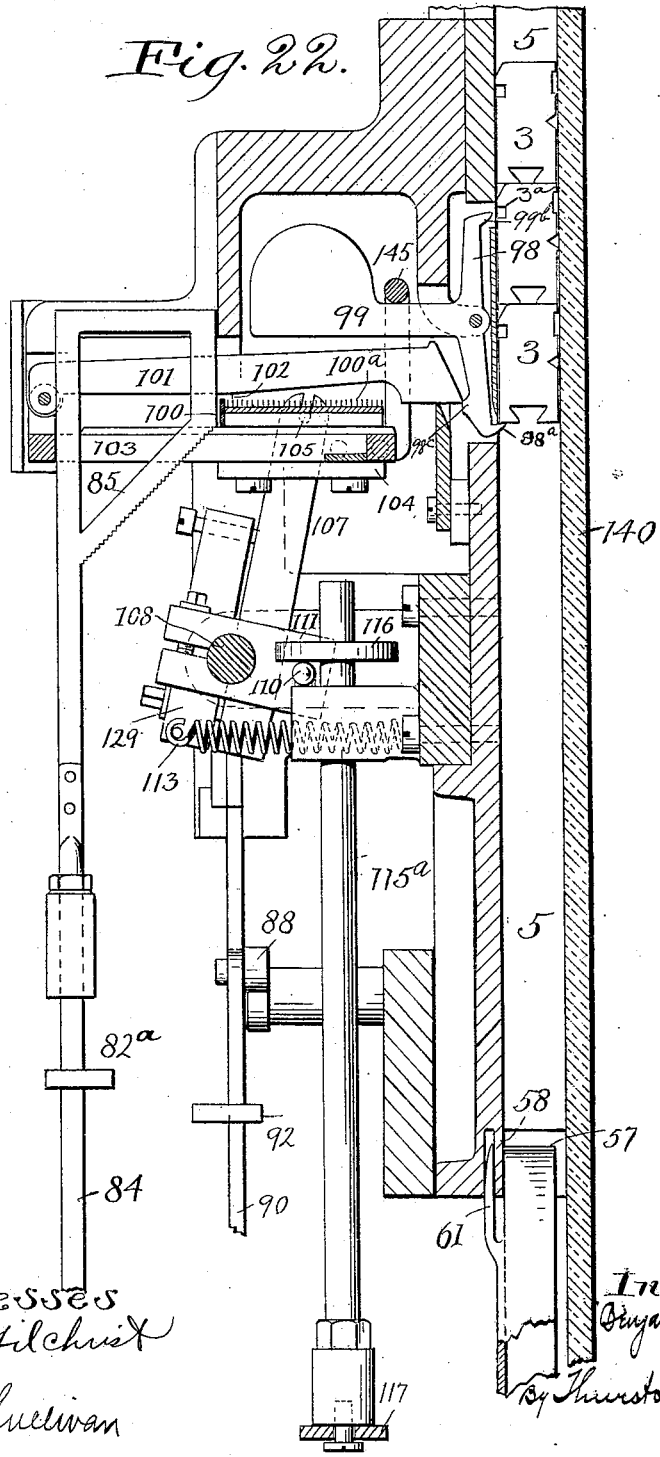

UNITED STATES PATENT OFFICE.

BENJAMIN F. BELLOWS, OF CLEVELAND, OHIO, ASSIGNOR TO THE ELECTRIC COMPOSITOR COMPANY, OF NEW YORK, N. Y., A CORPORATION OF NEW JERSEY.

JUSTIFYING MECHANISM.

No. 921,063.    Specification of Letters Patent.    Patented May 11, 1909.

Application filed August 15, 1906. Serial No. 330,685.

*To all whom it may concern:*

Be it known that I, BENJAMIN F. BELLOWS, a citizen of the United States, residing at Cleveland, in the county of Cuyahoga and State of Ohio, have invented a certain new and useful Improvement in Justifying Mechanism, of which the following is a full, clear, and exact description.

This invention relates primarily to those parts of a linotype machine by which the lines of matrices are justified. It also includes some coöperative mechanism by which each line, when justified, is moved toward the casting mechanism, and by which, at the proper time, said casting mechanism is set into operation or prevented from operating, as desired.

The invention is an improvement upon the generic invention which is described in my prior patent No. 727,267. It also resembles, in many respects, the justifying mechanism which formed the subject of my prior patent No. 795,449, and is, in a sense, an improvement upon that mechanism.

The invention may be summarized as the combinations of parts shown in the drawings and hereinafter described and definitely pointed out in the appended claims.

Figure 10:
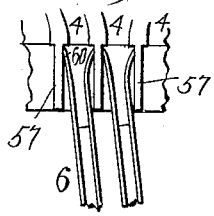
Figure 11:
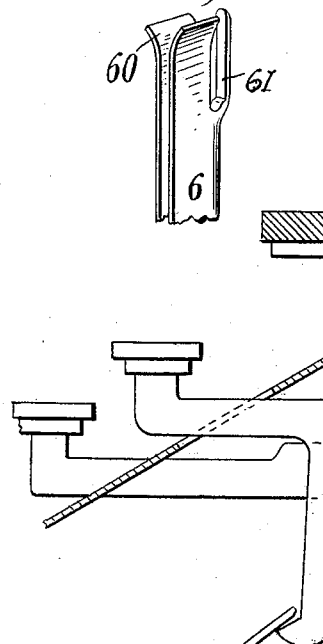
Figure 9:
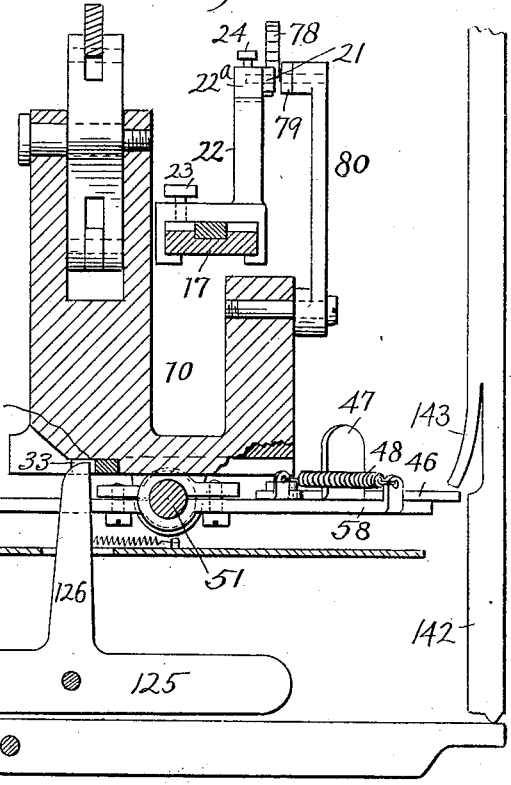
Figure 12:
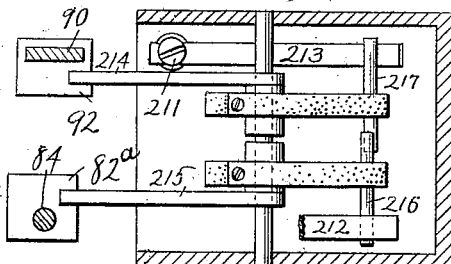
Figure 13:
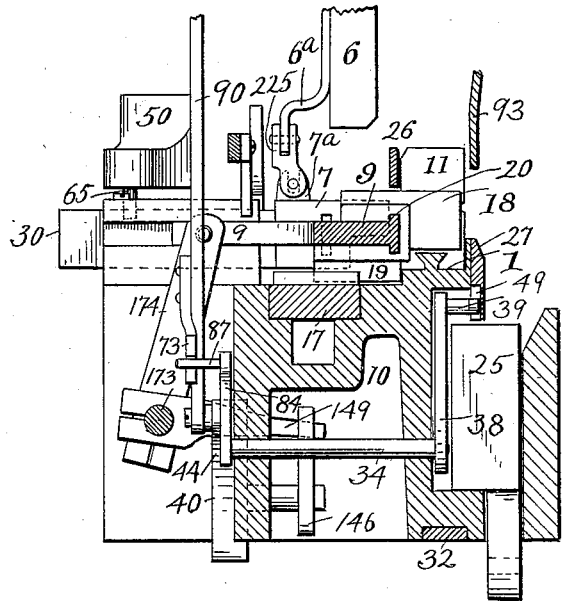
Figure 14:
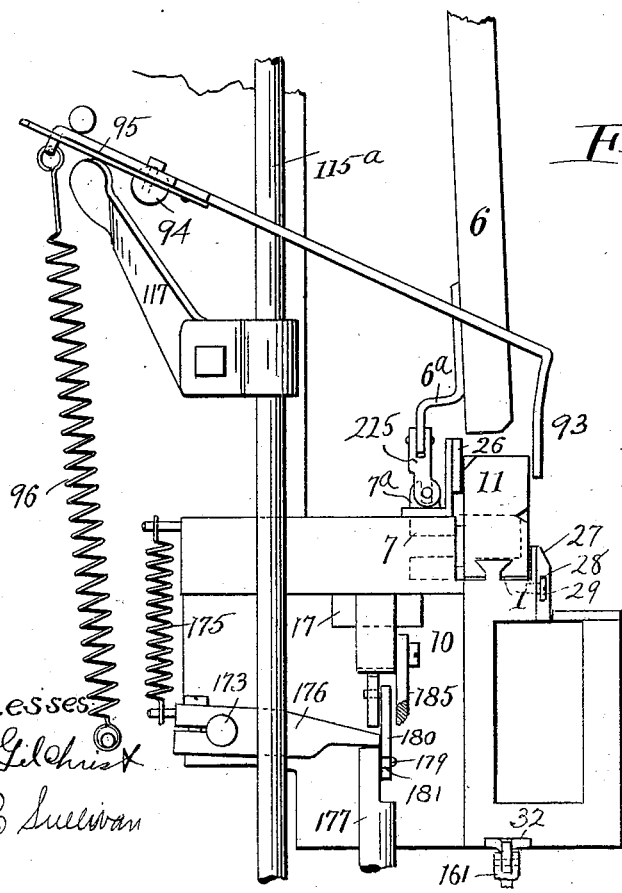
Figure 15:
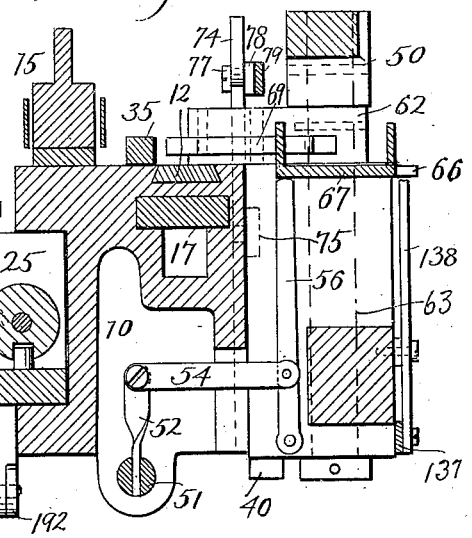
Figure 16:
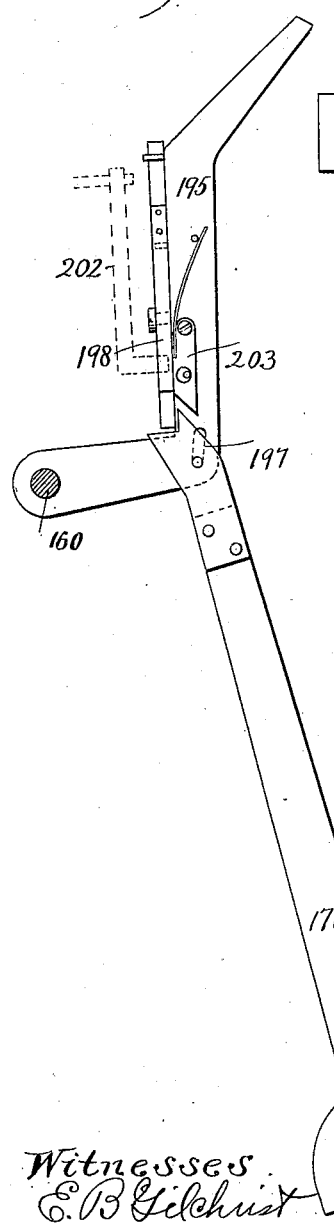
Figure 17:
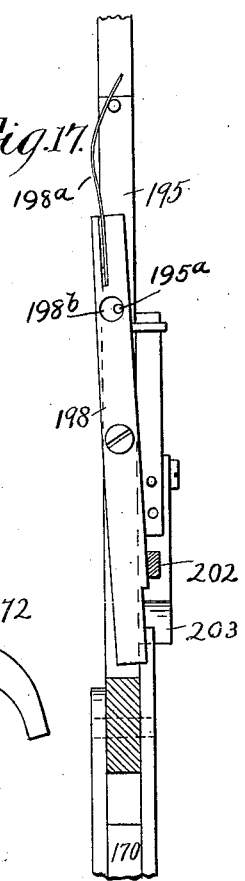
Figure 18:
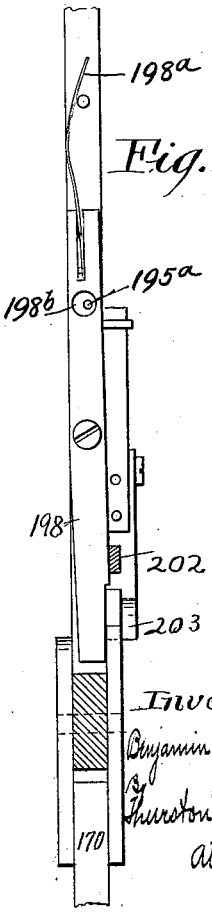

In the drawing Figure 1 is a front elevation of a part of a linotype machine embodying the present invention, Fig. 2 is an enlarged front elevation of a part of the justifying mechanism shown in Fig. 1. Fig. 3 is a sectional plan view in the plane indicated by line D—D on Fig. 1,—the matrix assembling spout, and the mechanism associated therewith being omitted from this figure. Fig. 4 is a full sized plan view of the arm 58 attached to the space key shaft and some mechanism associated therewith. Fig. 5 is a front elevation of one of the temporary spacers. Fig. 6 is a side view of one of the temporary spacers. Fig. 7 is a rear elevation of the mechanism shown in Fig. 3. Fig. 8 is a bottom plan view of said mechanism. Fig. 9 is a transverse vertical section in the plane indicated by line A—A on Fig. 1. Fig. 10 is a front elevation of the lower ends of two spacer magazines and the upper ends of two of the spacer assembling tubes associated therewith. Fig. 11 is a perspective view of the upper end of one of the spacer assembling tubes. Fig. 12 is a sectional plan view of the electric signal switch mechanism. Fig. 13 is a transverse vertical section in the plane of line B—B on Figs. 2 and 3. Fig. 14 is a left end view of certain parts of the mechanism. Fig. 15 is a transverse vertical section in the plane indicated by line C—C on Fig. 7. Fig. 16 is a rear view of the right side of the members 170 and 195 and the operative connections between said parts. Fig. 17 is a left side view of the connection between the members shown in Fig. 16, showing them in the position they normally occupy. Fig. 18 is a similar view, showing the parts in the position they occupy when they have been rendered inoperative for transmitting motion from member 170 to member 195. Fig. 19 is a front view of the mechanism for driving certain parts of the justifying mechanism, the transverse slide and casting mechanism; this view being taken in section just behind the front plate of the supporting frame. Fig. 20 is a right side view of the cam shaft 150 and associated parts. Fig. 21 is a rear elevation of the selecting plate and mechanism adjacent thereto. Fig. 22 is a sectional side elevation of the parts shown in Fig. 21; the sectional line of the parts section being the line E—E.

The mechanism shown in the drawing in which this invention is embodied is, in many respects, substantially like the mechanism shown and described in my prior patent No. 797,549. In order that the operation of the present invention may be understood, however, it will be necessary to describe the construction of some of the mechanism which corresponds with that shown in said prior patent. That description will, however, be as brief as the conditions will permit.

In assembling the matrix or type lines to be justified, the matrices 11 (or type) are released, one by one, from their respective magazines, and are delivered onto the assembling rail 1 through an assembling spout 2. After each addition to a growing line on the assembling rail, the line is moved along said rail a distance equal to the width of the addition. The line may be so moved by a packer 15 which is constantly reciprocated in a definite path. The packer and its operating mechanism may be like that shown for the purpose in my prior patent No. 800,971.

The permanent spaces 3 are stored in magazines 4, each of which has a plurality of channels 5 for containing spacers of different thicknesses. The front of the magazines is formed by a glass plate 140. Each spacer channel has an independent escapement mechanism of some approved form, for releasing the spacers singly from said channels. Each of said escapement mechanism must include an operating device as lever 101; and each of said escapement operating levers is provided, on its under side, with a pin 102 adapted to be engaged by some of the pins 100ª which project upward from the selecting plate 100. In the construction shown each escapement includes a pallet lever 98 which is provided with, a weighted horizontal tail piece 99; and the operating lever 101 engages with this tail piece to operate it. The bottom claw 98ª of the pallet lever normally projects under the lowest space in the magazine channel, while the upper claw 98ᵇ is extended to enter a notch 3ª in the space. The front part of lever 101 rests upon a fixed part of the frame of the machine; and its front end is directly behind a little shoulder 98ᶜ on the pallet lever whereby the operation of the lever 98 is prevented, until the lever 101 is moved upward out of the path of said shoulder.

Each of the spacer magazines 4 has a contracted lower end which communicates directly with a tube 6; and each of these tubes has a temporary spacer 7, flexibly connected with its lower end. The upper end of each tube has outwardly flaring sides 60 which bear against downwardly projecting ribs 57 located between the discharge mouths of the several magazines. On the rear side of the upper end of each tube is a rearwardly bent finger 61; and a flange 58 projecting down from the spacer magazine block goes between this finger and the rear part of the tube. The upper ends of tubes therefore lie below and are overhung by the lower ends of the block in which said spacer magazines are formed; and the lower ends of the tubes may be moved as required without disturbing this condition.

The temporary spacers 7 are not tubular as they are in the construction shown in my prior patent. They are solid metal blocks about half as high as a matrix; are quite a bit longer from front to rear than the width of the matrices. Their rear ends are flexibly connected with the rear side of the associated tube 6. On top of the rear end of each spacer 7, is a notched ear 7ª. A bent arm 6ª is connected with the rear side of the lower end of each tube 6, and this arm and the ear 7ª are connected with an intermediate piece 225 by pivots which are respectively at right angles to each other. The described connection between the tubes and spacers is flexible to the required degree, because it permits the spacers to remain upright whether they are behind the assembling rail or over it, or whether they are in or have been moved to the left out of their normal position. In the rear end of each of these temporary spacers is a dove-tailed notch 8 which permits said temporary spacers to be threaded onto the dove-tailed front edge of the slide 9 when said spacers have been pushed forward into position over the assembling rail. These temporary spacers are all of the same thickness, and this thickness is substantially equal to the width of the steps on the eliminator lever 78.

The only important differences between the mechanism above described and that shown in my prior patent No. 797,549 is the substitution of solid temporary spacers for tubular temporary spacers and their specific construction; the specific connection between these spacers and the tubes 6; and the construction of the upper ends of the tubes and the parts immediately associated therewith whereby they maintain their operative relationship with the spacer magazine at all times.

Directly behind the assembling rail is a fixed guard rail 26 held in such position that the temporary spacers may pass under it when they are moved forward so as to extend over the assembling rail. The temporary spacers rest upon the frame member 10 and normally lie in a compact row behind the assembling rail. A spring-actuated spacer packer slide 12 is provided with an upwardly extended finger 13 which bears against the right end of said row and pushes the row to the left against the right end of slide 9.

When the space key is depressed the left hand temporary spacer is pushed forward out of the described rank and into a position projecting over the assembling rail. The mechanism for causing this movement will be presently described. Whenever the spacer is so moved forward out of the row the remaining spacers in the row are all moved to the left until stopped by slide 9.

The detent slide 17 is movable in the horizontal path crosswise of the machine; that is to say, to right and left. It has in its top face a slot 16 which extends in a direction at right angles to the path of the slide (shown in dotted lines in Figs. 3 and 13) which receives a downwardly projecting rib 19 on the lower face of the detent 18 (see Fig. 13). This detent embraces the dove-tailed front end of the slide 9 (see Fig. 13), and, therefore, may move from right to left without there being any movement of the slide 9; but it must accompany the slide 9 in its forward and backward movement. When the slide 9 is moved forward this detent extends over the assembling rail, but is drawn back of the same when slide 9 is drawn back, but the detent never becomes disconnected from the detent slide and must therefore move in unison with said slide to right or left. The slide 9 is moved backward and forward by means of a rock-shaft 173 carrying two arms 174 which are connected with said slide. This rock-shaft is moved in the direction which carries the slide forward by means of a spring 175. This rock-shaft is also provided with an arm 176. The upward movement of the rod 177 against this arm moves the rock-shaft in the direction which draws the slide 9 backward.

Directly behind the left temporary spacer is a forwardly and backwardly movable spacer inserting slide 30 having in its top edge a transverse notch 31. This notch receives a pin 65 on an arm 64 attached to a vertical rock-shaft 63. Whenever the rock-shaft 63 is rocked, the slide 30 is moved forward by the described mechanism thereby pushing the left temporary spacer forward so that its front end extends over the assembling rail (see Fig. 14). The line packer 15 then pushes this temporary spacer to the left a distance equal to the width of the spacer. When the slide 30 is drawn backward, the temporary spacers remaining in the row are all pushed by the tube packer 12 to the left against the end of slide 9. When the spacer, which has moved forward into the assembling line, was pushed to the left by the packer, its notch 8 slipped over and embraced the front edge of slide 9.

The space key 53 is connected with a rock-shaft 51 to which is attached an arm 52. This arm is connected by a link 54 with a rocking detent 56. The upper end of this detent normally lies just below the front edge of the left end of the trough 67,—which trough is pivoted at its right end to the frame of the machine, on a horizontal axis. Normally the left end of this trough is higher than the right end. There is a ball 68 in this trough; and when the detent 56 is withdrawn from beneath said trough through the operation of the space-key, the trough falls to an inclined position; and the ball therein rolls down it, to the left, against the tail of a spring-actuated detent 69. This detent is pivoted upon an arm 62 which is secured to the rock-shaft 63, and it normally engages with a shoulder 70 on a spring pawl 71 which is pivoted to the same arm 62. This detent acts to hold this pawl against the force of its spring, in such a position that it will not be engaged by a shoulder 36 on the constantly reciprocating slide 35. When the ball, rolling down the trough strikes the detent 69, it withdraws it from the shoulder 70, whereupon the pawl 71 is moved by its spring into the path of the shoulder 36 on said reciprocating slide 35. In the next movement of said slide to the right, this shoulder, by engaging with the forward end of said pawl, rocks rock-shaft 63, and thereby, through the described mechanism, the left hand spacer is pushed forward. The rock-shaft 63 has another arm 50 carrying a friction roller in its end. The trough is provided with an inclined end wall 72 near its attached end. When rock-shaft 63 is rocked in the direction last described, this arm 50, by engaging with the inclined wall 72 on the trough, rocks said trough back to its normal position. The ball thereupon rolls to the right against the wall 72. The space-key has in the meantime been released. The spring 55 on its rock-shaft returns it to its normal position, and this carries the detent 56 beneath the trough, whereby the latter is held up until again released by the operation of this space-key.

While the slide 35 is rocking the rock-shaft 63 in that direction which causes the spacers to be moved forward the pawl 71 while maintaining its engagement with the shoulder 36 on slide 35 will be turned on its pivot enough to permit the detent 69 to again engage with the shoulder 70. When slide 35 again moves to the left, another shoulder 37 thereupon engages with the other end of the pawl 71 and thereby rocks the rock-shaft 63 in the reverse direction back to its normal position.

The selecting plate 100 may be precisely like the selecting plate shown and described in detail in my prior patent No. 797,549. It is movably supported upon the top of a pivoted frame 103, and is provided with arms 104 which pass under and engage with the lower surface of the end members of said frame. It lies between and its ends are connected with the upper ends of the arms 107 attached to the rock-shaft 108 just as in my prior patent No. 797,549. The rock-shaft 108 is capable of rocking in its bearings; and it is subjected to the influence of a spring 113 tending to rock it in that direction which will cause the rearward movement of the selecting plate,—this spring 113 being attached to an arm 129, on said shaft. The shaft is also under the influence of the spring 109 tending to move it endwise in its bearings. The endwise movement of said shaft is limited by the engagement of the pointed end of the shaft with the stepped wedge 91. The rearward movement of the selecting plate, when the shaft is permitted to rock under the influence of its spring 113, is limited by the engagement of said selecting plate with the stepped wedge 85.

In nearly all of the respects above mentioned as well as in the specific form of the selecting plate itself the described mechanism is substantially like the corresponding mechanism in my prior patent No. 797,549. There are however two points of difference between the mechanism of that patent and the mechanism above described, viz; in the present construction the shaft 108 has a pointed end which engages directly with the stepped wedge 91, and the risers of this stepped wedge are inclined, wherefore the downward movement of this wedge block causes the various steps thereof to travel in contact with the shaft 108 and thereby said shaft is moved endwise to return it to its initial position. Every time a temporary spacer is added to the line this stepped wedge moves upward a distance equal to the width of one step, and this permits shaft 108 to be moved by its spring a distance equal to the height of one step. The other difference is that whereas in the construction of the former patent the selecting plate was permitted to move rearward every time the stepped wedge 85 moved upward, in the present construction the selecting plate is restrained from any rearward movement whatever until said stepped wedge has been moved upward as far as it is to be moved by the particular line to be justified. This wedge is moved upward every time the line is lengthened by the addition of a matrix after the line has reached a predetermined length; and this upward movement is due to the movement of the growing line along the assembling rail, after each addition of a matrix to the line, a distance equal to the width of that addition. This movement of the line is transmitted to the detent and detent slide; from the latter to the stepped eliminator 78; from it to the horizontally movable bar 79, and thence through lever mechanism to the wedge. The line itself is moved by the line packer; and it sometimes happens that the parts intermediate of the line and the wedge 85 acquire a momentum which will carry the wedge temporarily past the position which it should occupy. If, as in the former device, the selecting plate immediately follows the wedge, the latter cannot settle back to its proper position and hence the selecting plate becomes misplaced and the justification becomes imperfect. In the present construction, however, that upward movement of the selecting plate which causes its pin to engage with pins on the escapement operating lever 101, is produced by upward pressure from a vertical bar 115. This bar is moved down by a spring 106, which is secured to the lower end of a bar 115ª to which the bar 115 is attached by means of an arm 117 and is moved up by a cam 151 on the cam shaft 150,—the bar 115ª being provided with an arm 105 engaging with said cam. This bar 115 has near its upper end a disk or collar 116 which engages upon the top of a crank pin 110 carried by an arm 111 attached to the rock-shaft 108.

The described mechanism prevents the rock-shaft 108 from being rocked by its spring 113 and therefore prevents the selecting plate from moving rearward. But when the stepped wedge 85 has been moved as far as necessary in accordance with the length of the line to be justified, the line key is depressed, and this, through mechanism to be presently described, causes the rotation of the cam shaft 150 and the consequent upward movement of the bar 115,—which movement is of course associated by a like movement of the collar 116. This permits rock-shaft 108 to be rocked by its spring, and thereby the selecting plate is carried rearward until further rearward movement is prevented by its engagement with the proper step on the stepped wedge 85. When the cam shaft completes its rotation it permits the spring 106 to move bar 115 downward, and the collar 116, by engaging with said pin 110 rocks the rock-shaft 108 and thereby the selecting plate is returned to its initial position.

The upward movement of the selecting plate due to upward pressure from bar 115 is of course accompanied by the upward swinging movement of the frame 103. This frame carries a yoke bar 145 which extends over and engages with the tops of the rearwardly projecting tails 99 of the escapement levers. It is therefore impossible to operate one of these escapement levers without at the same time moving up this frame 103. The downward movement of the frame, draws this yoke bar 145 downward, and it positively draws down any of the escapement levers which have been operated while said frame was up.

The spacer packer slide 12 is, as stated, under the influence of a spring 41 tending to move it to the left. This spring, however, is not attached directly to the slide. It is attached to one arm 44 of a three-arm lever 40. One of these arms 43 is provided with an overhanging finger 42 which engages with the finger 13 on the slide. Another arm 44 is connected with a vertically movable link 90 whose upper end is connected with one arm of a pivoted lever 88, the other arm of said lever being connected to the stepped wedge 91. It is therefore evident that, when a temporary spacer is moved forward out of the row in which it normally stands, and said row is therefore moved to the left a distance equal to the spacer withdrawn from it, this lever 40 will swing and it will result, through the described mechanism, in moving wedge block 91 up a distance equal to the width of one of the steps thereon. This wedged block is movable through a guide-way in a block 120 which is mounted in horizontal guide-ways which are a part of the fixed frame of the machine. A set-screw 121 passing through one member of this frame bears against the block 120 and furnishes the means for very accurately adjusting its position, and consequently the position of the wedged block 91 relative to shaft 108. The other arm 45 of the lever 40 is pivotally connected with the lower end of a bar 74 in whose upper end is a curved slot 76. A link 75 whose length is equal to the length of the lever arm 45 is pivoted to the frame and also to said bar. By these means, the bar 74 is caused to move vertically whenever the lever is rocked, and to preserve a position parallel to its initial position, although it does not move in a strictly straight line.

The horizontally movable bar 79 is pivotally connected to the upper ends of two parallel pivoted levers 80 and 81. One of these levers has an arm 83 to which the lower end of the tail 84 of wedge 85 is pivotally connected. A stepped lever 78 whose function is to serve as an eliminator, is pivoted to the bar 79. The width of the various steps thereon is equal to the width of each of the temporary spacers. The steps of this eliminator project into the path of a lever 21 pivoted to the rear face of a block 22 which is adjustably secured to the detent slide 17. This block consists of two parts 22, 22$^a$ adjustably secured together, by a set-screw 24 and the block as a whole is adjustably secured to the detent slide by set-screw 23. This block is made adjustable so as to adapt the mechanism for justifying lines of various length,—the said block being placed at such point on the detent slide that it will, at the proper time, come into contact with whichsoever of the steps on the eliminator 78 is in the path of said lever 21. The stepped lever eliminator extends on both sides of its pivot. That arm which is opposite to the arm carrying the wedge steps is provided with a pin 77 which enters a slot 76 in the vertically movable bar 74. The lower end of this bar is pivotally connected with the arm 45 of the lever 40, which lever it will be remembered, rocks a definite distance every time a temporary spacer is pushed out of its waiting rank into a growing line. This movement of said lever causes a corresponding vertical movement of bar 74 and this movement is sufficient to so rock the stepped eliminator lever as to bring another step thereon in the plane of the lever 21. When thereafter the line is moved along a distance equal to the width of the temporary spacer added the detent slide receives a corresponding movement, but this movement does not cause any movement of the bar 79 because, by reason of said movement of the stepped eliminator lever, the detent slide must move a distance equal to the width of said space before the lever 21 again comes in contact with the new step on the eliminator lever which has been moved into its path. The addition of matrices to the line will cause a corresponding movement of the detent slide, and it will, through the described mechanism, cause a corresponding movement of the endwise movable bar 79, and these movements will be transmitted through the lever arms 81 and 83 to the vertically movable stepped lever 85. Whenever the line is ready to be justified this stepped wedge will be in such a position that when the selecting plate is allowed to move back into contact with it said selecting plate will be in a position to release a permanent space from each magazine whose delivery tube 6 has been moved forward; and the aggregate width of the spacers so released will be exactly equal to the line shortage.

Having now described mechanism by which the justifying mechanism is set, I will now describe the means whereby the spacers are released and delivered into the line and all the parts returned to their initial position, and the justified line moved on toward the casting mechanism. The operating mechanism includes a number of cams attached to a normally non rotating cam shaft 150; and suitable clutching mechanism for connecting this cam shaft to a rotating element. Loosely mounted upon this cam shaft is a ratchet 152 attached to a gear 153, which is to be constantly rotated. One of the cams 154 has a pawl 155 pivoted to it; this pawl being attached to a rock-shaft 156 to which also an arm 157 is attached. This arm is normally engaged by a lever 158 attached to a rock-shaft 160. An upwardly extended arm 161 is also attached to the rock-shaft 160, and this arm is connected with a transversely movable slide 32 located just below the assembling rail. This slide has a notch 33 in it, into which, normally, an arm 126, attached to the line key 125, projects. By depressing the line key this arm is withdrawn from said notch whereupon the slide is moved to the left by the action of a spring 162 upon the rock-shaft 160. The movement of the rock-shaft withdraws the lever 158 from its engagement with the arm 157 on the pawl rock-shaft, whereupon said pawl flies into engagement with the ratchet 152 and the cam shaft immediately begins to revolve. There are six cams upon this cam shaft. The first of these cams to become affected is the cam which engages with the arm 105 on the vertically movable bar 115$^a$. This bar is thereby moved upward, and consequently the connected bar 115 is similarly moved with the result of first raising disk 116 so as to permit rock-shaft 108 to be turned by its spring, and thereby to carry the selecting plate into contact with the stepped wedge 85. The further upward movement of this bar 115 brings it against the selecting plate and moves the same upward so as to operate the proper escapements and release the proper permanent spaces, which thereupon fall down through the tube 6 and take their places on top of the temporary spacers 7 in the line. There is a V-shaped groove 7$^b$ (see Fig. 5) in the tops of these spacers, and the permanent spaces come to rest upon the temporary spacers, with their lower ends in said groove. As this cam 162 continues its revolution it will permit spring 106 to draw bar 115 down and thereby the selecting plate will be moved forward by the mechanism described, to its initial position.

During the upward movement of bar 115ª the arm 117 attached thereto engages with the rear end of arm 95 attached to a rock-shaft 94. A guard plate 93 is attached to the front end of said arm 95. The upward pressure of this arm 117 turns the rock-shaft so as to swing this guard plate down in front of the assembling rail, whereby the permanent spaces, when they fall onto the temporary spacers will remain in the line instead of bounding forward out of the same. A spring 96 acts to turn this rock-shaft 95 in the reverse direction, when it is permitted to so turn by reason of the downward movement of the bar 115ª. The next cam to become operative is the cam 163 by means of which slide 9 is drawn backward. This cam engages with an arm on the vertically movable bar 177. The cam is so formed that before it imparts any upward movement to said bar it permits the bar to be moved downward slightly by a spring 178 and this is for the purpose of operating mechanism which will move the detent slide to the left a short distance. The mechanism for doing this consists of the pivoted lever 180 having in one end a slot 181 which takes over a pin 179 on the rod 177. A weighted pawl 182 is pivoted to this lever for engagement with ratchet teeth on the under side of the detent slide. By the downward movement of the rod 177 this lever is so rocked that the pawl thereon by engaging with said ratchet teeth will move the detent slide to the left. This relieves the line of all endwise pressure which might tend to close the gaps therein left by the withdrawal of the temporary spacers,—and therefore allows the permanent spaces to drop down onto the assembling rail when the temporary spacers are withdrawn. The rod 177 is next moved upward by this cam 163, and in its upward movement it rocks rock-shaft 173, so as to draw slide 9 backward and thereby withdraw the detent and the temporary spacers backward out of the line. This same upward movement of the rod 177 swings lever 180 so that pawl 182 is entirely withdrawn from the range of the ratchet teeth of the detent slide. The guard rail 26 prevents the permanent spaces from moving back with the temporary spacers.

While slide 9 is in its rearmost position as described the detent slide is moved to the right, back to its initial position. The detent is carried with it, and this detent by engaging with the temporary spacers 7 which are embracing the front edge of slide 9, moves said spacers off of the end of said slide and holds them disengaged from the slide until the slide moves forward again. This retracting movement of the detent slide is accomplished by means of a lever 183 (see Fig. 7) having a forked upper end which embraces a pin 14 on the detent slide. This lever is pivoted and is provided with an arm 186 which engages with a cam 165 attached to the cam shaft. After this movement, the line transfer slide 25 is moved to carry the justified line off of the assembling rail toward the casting mechanism. The slide itself is substantially like the slide shown in my prior patent. It is moved, however, by a lever 191 which is connected with said slide by a link 192. This lever has an arm 193 which is engaged by a cam 166. The cam moves the lever in the direction which causes the transfer slide to carry the justified line to the casting mechanism. A spring 194 moves it in the opposite direction. While these operations have been going on a cam 154 has engaged with an arm 159 attached to the lever 158 and thereby said lever has been rocked to a position in which its end will engage with the arm 157 on the rock-shaft of the pawl 155 and thereby withdraw said pawl from engagement with the ratchet when the cam shaft has made one revolution. The described movement of this lever has also rocked the rock-shaft 160 so that the slide 32 is returned to that position where its notch 33 may be engaged by the arm on the line key. There is one other cam 167 on the cam shaft 150 whose function is to set the casting mechanism in operation whenever a justified line has been moved by the transfer slide into the embrace of said casting mechanism. The casting mechanism itself is not shown. It is however to be driven by a constantly rotating shaft 187 to which a ratchet 188 is attached. A gear 189 loose upon this shaft carries a pawl 190 for engagement with this ratchet, and this pawl is connected with a rock-shaft 184 mounted in gear and having an arm 185 projecting into the path of one arm of lever 195, which is loosely hung on rock-shaft 196. A bar 170 having a fork 171 in its lower end, embraces a groove 169 in the cam 168 and carries a friction roller 172 adapted to engage with a cam 168. The upper end of this bar has a pin 164 engaging in a substantially vertical slot 197 in lever 195. This lever carries a spring pawl 198 which normally lies in the path of the upper end of the bar 170. Just as the cam shaft 150 is completing its rotation, cam 168 moves the bar 170 endwise and this bar by engaging with said pawl 198 swings lever 195 on its pivot and thereby releases pawl 190. A spring 199 thereupon swings the pawl 190 into engagement with the ratchet 188; and thereupon the driving mechanism of the casting mechanism begins to rotate.

It sometimes happens however that one does not wish the casting mechanism to operate to make a linotype from an assembled line. Means are provided for preventing the starting of the casting mechanism whereby the line may go past it without being subjected to its action. This mechanism consists of a rock-shaft 200 having an operating arm or key 201 by which the operator may manually rock said rock shaft, and having also another arm 202 which occupies such position that it may engage the pawl 198 on lever 195, and by so engaging with it may push it out of the plane in which the upper end of bar 170 moves. When it is so pushed, a spring detent 203 flies behind it and keeps it in said withdrawn position. The movement of the bar 170 due to the action of cam 168 thereon, has then no effect upon the lever 195; but when said bar 170 moves downward it will turn slightly upon pin 164 as a pivot, and its end will engage with this detent 203 and withdraw it, and thereby the pawl 198 will be moved by its spring 198$^a$ back to its initial position. The pawl 198 is prevented from going beyond said initial position by a pin 195$^a$ which is secured to lever 195 and projects into a relatively large hole 198$^b$ in pawl 198.

It will be found that, when the parts operated by said cam shaft 150 have been moved thereby, all of the parts which are moved from their normal position during the assembling and justifying of the line have been returned to their normal positions either by springs which have been described or by mechanism positively operated from said cam shaft which will now be referred to.

The downward movement of the stepped wedge 91 causes the movement of shaft 108 back to its initial position. The power to so move the stepped wedge downward is taken from rock-shaft 173 and is transmitted through the following chain of mechanism, to wit; an arm 149 fast to said shaft, and projecting forward therefrom into a slot 147 in a link 146 pivotally connected with the same arm of lever 40 to which the upwardly extended bar 90 is connected. This slot in the link is of such length that it does not interfere with the downward movement of said lever arm 149 through the six step by step movements which it receives as the temporary spacers are moved out of their row into the growing line. When however the rock-shaft is rocked for the purpose of drawing slide 9 rearward the said arm will move into engagement with the upper end of said slot and will thereafter pull upward on the link with sufficient force to rock the lever and thereby to push upward on the link 90, whereby the lever 88, is rocked and the stepped wedge 91 moved downward to its initial position with the result of moving shaft 108 back to its initial position.

When the tail piece 90 is moved downward six steps, as it will be, through the described mechanism, when the six tubes shown have been moved forward into the growing line, a finger 89 thereon will have come in contact with, and will have moved one arm of a pivoted bell crank lever 136. The vertical arm of this lever is connected with a horizontally movable bar 137 which is connected with the lower end of a detent lever 138 which normally occupies an inactive position. When, however, the bar is moved in the manner described this detent lever is swung so as to take a position beneath a toe 66 on the ball trough 67. If now the space key 53 is depressed the trough will not fall but will be upheld by this detent lever. There will consequently be no movement of those parts, whose movement is initiated when the trough drops and the ball therein rolls down against the detent 69. A rearwardly extended arm 58 is attached to the space key rock shaft. A lever 46 is pivoted upon this arm, and has an upwardly extended finger 47 which extends into the path of the end of the bar 137. A spring 48 engaging with this lever tends to spring it so as to maintain the engagement between the finger 47 and bar 137. When the bar 137 is moved endwise by the rocking of the bell crank 136, it swings this lever 46 on its pivot, and thereby carries the end of said lever beneath a projection 143 on a vertically movable rod 142 which is provided for operating the escapement of a magazine containing a spacer of the average width for use in justifying a line. The depression of the space key therefore after all of the tubes have been inserted in the growing line will cause the release of a permanent space from one of the socalled matrix channels, and said space will be assembled in the line just as matrices are when they are released.

It is desirable that the operator be able to determine at any time the length of the line he is assembling,—or more exactly the length which the line would have if justified. For this purpose a transversely movable scale 27 is suitably supported in front of the assembling rail. The heads of screws 29 screwing into the frame member 10, fit a horizontal dove-tailed groove 28 in the rear face of said scale. If this scale were absolutely stationary it would merely show the length of the line made up of matrices plus the total width of the temporary spacers therein. These spacers however are always considerably larger than the permanent spaces which the justified line will contain. To know the length of the line containing temporary spacers is not what is required by the operator. This scale is therefore movable, and it is moved with the line whenever a temporary spacer is put into the line. This movement of the scale is not however equal to the width of the temporary spacer, but is equal to the difference between the width of the temporary spacer so added, and the width of what may be called the standard space, that is to say, a spacer such as will give the ideal spacing between words. The left end of the line will therefore always be opposite to a graduation upon this scale which shows the actual length which the line as then composed would have if it were spaced with said standard space. To effect this movement of the scale a rock-shaft 34 is provided having two arms,—one 38 which has a crank pin 39 engaging in the vertical slot 49 in the rear face of the scale. The other arm 82 has a crank pin 87 engaging in a horizontal slot in an arm 73 connected to the vertically movable bar 90 which, it will be remembered, moves down a definite distance every time a temporary spacer is added to the line. The lever arms upon this rock-shaft are so proportioned that the scale will move, as before stated, every time a temporary spacer is added to the line, a distance equal to the difference between the width of the spacer so added and a standard justifying space.

It is also desirable that a signal be displayed when the line is nearing completion; and, preferably, this signal should be displayed the instant the line beomes capable of being justified by the described mechanism. In the machine illustrated in the drawing, mechanism is provided for giving a signal at this preferred time. The signal 226 may be a lamp, a bell, or a buzzer, or any other device capable of being rendered operative by the completion of an electric circuit. The mechanism shown consists of two binding posts 210 and 211 to be connected with the terminals of the signal circuit, and which are electrically connected with two springs 212 and 213. Two levers 214 and 215 respectively carry near their rear ends insulated pins 216 and 217. The two springs bear respectively against these pins, and obviously when these pins come in contact the circuit will be closed. These two levers bear at their front ends respectively upon two shelves 82ª, 92 which are respectively secured to the vertically movable members 84 and 90. It will be remembered that the bar 90 moves down a short distance every time a space is added to the line; and this movement will permit such a movement of the lever 214 that the pin 216 thereon will be moved toward the pin 217. It will also be remembered that as the line is lengthened by the addition of matrices thereto rod 84 moves upward; and this permits such a movement of the lever 215 that the insulated pin thereon 217 will be moved nearer to the pin 216 on the other lever. This obviously is a proper movement, because by the addition of matrices alone the line would evidently get long enough to be justified if only by the addition of one spacer. It is also obvious that two contact pins should be brought nearer together by each addition of a temporary spacer to the line because the more permanent spaces there are to be added to the line the shorter may be the line made of matrices alone in order to be justifiable. The capability of the line to be justified is dependent not only on its length made up of matrices alone but by the number of spacers which must be employed for justification. The closure of the electric circuit which renders the signal operative is, because of the construction above described, dependent upon these two factors.

In Fig. 21, the switch closing mechanism for the signal is shown in a position which indicates that the line is nearly ready to be justified.

Having described my invention I claim:

1. In justifying mechanism, the combination of a plurality of spacer escapements, a movable device for operating any required combination of said escapements, a movable stop whose position is determined by the aggregate width of the matrices in the line to be justified, a spring acting to move said escapement operating device toward said stop, mechanism for moving the escapement operating device against the escapements to operate them, and restraining means controlled by the last mentioned mechanism for temporarily preventing said spring-induced movement of the escapement operating device.

2. In justifying mechanism, the combination of the selecting plate 100, spring-actuated mechanism for moving said plate in two relatively transverse directions in a substantially horizontal plane, mechanism for moving said plate vertically, restraining means controlled by the last mentioned mechanism temporarily preventing the spring-induced movement of the selecting plate in one direction, and an adjustable stop interposed in the path of said spring-induced movement of the selecting plate for stopping such movement when the plate has been released by said restraining means.

3. In justifying mechanism, the combination of a selecting plate 100 capable of moving vertically, and horizontally in two directions at right angles to each other, a rock-shaft operatively connected with said selecting plate, a spring acting to rock said rock-shaft, a vertically movable member for moving said selecting plate vertically, an arm carried by the rock-shaft, and a flange carried by said vertically movable member whereby the spring-induced movement of the rock-shaft is restrained, a wedge and its operating mechanism limiting that movement of the selecting plate which results from the spring-actuated movement of said rock-shaft, and mechanism for moving upward the vertically movable member.

4. In justifying mechanism, the combination of a selecting plate carrying escapement operating pins, a support therefor on which said selecting plate is movable, a rock-shaft having a conical end and arms engaging with selecting plate, a spring tending to move said rock-shaft endwise in its bearings, a movable stepped wedge against the stepped face of which the conical end of the rock-shaft bears,—the steps of said wedge being connected by easy inclines, and mechanism for moving said wedge in both directions.

5. In justifying mechanism, the combination of a selecting plate carrying escapement operating pins, a support on which said selecting plate is movable, a stepped wedge limiting the movement of said plate in one direction, an adjustable block in which said stepped wedge is movable, and mechanism for moving said stepped wedge.

6. In justifying mechanism, the combination with the selecting plate 100, an endwise movable rock-shaft for moving the selecting plate, a spring for so moving it, a block mounted in horizontally fixed guide-ways, an adjusting screw for determining the position of said block, and a movable stepped wedge mounted in said block in engagement with said rock-shaft.

7. In justifying mechanism, the combination of a horizontally movable selecting plate carrying pins for operating spacer escapement mechanism, a support therefor, mechanism impelling said plate to move upon said support, means restraining said movement, a stepped wedge to limit said movement, a line key, and mechanism set in operation thereby for releasing said selecting plate from said restraining means.

8. In justifying mechanism, the combination of a selecting plate carrying pins for operating spacer escapements, a vertically movable support for said plate, mechanism impelling said plate to move rearward upon said support, a vertically movable bar adapted to move the selecting plate and its support upward, means carried by said bar restraining the rearward movement of the selecting plate, a stepped wedge limiting the rearward movement of the selecting plate when released from said restraining mechanism, a line key, and mechanism set in operation by the line key for moving said bar upward.

9. In justifying mechanism, the combination of a selecting plate carrying escapement operating pins, a vertically movable support therefor, mechanism impelling said plate to move rearward, mechanism for moving said selecting plate upward; means controlled by the last mentioned mechanism restraining the rearward movement of said selecting plate, mechanism whereby the position of this stepped wedge is dependent upon aggregate width of the matrices in the line to be justified, a line key, and mechanism set in operation thereby for moving the mechanism which moves the selecting plate support upward and thereby removes the restraint upon the rearward movement of said selecting plate.

10. In justifying mechanism, the combination of a selecting plate carrying escapement operating pins, mechanism impelling the same to move rearward, mechanism for moving said plate upward, a stepped wedge for limiting the rearward movement of said selecting plate, means temporarily restraining the said rearward movement of the selecting plate, a line key, and mechanism set in operation thereby which first releases said selecting plate from the mechanism restraining its rearward movement and which thereafter moves the selecting plate upward.

11. In justifying mechanism, the combination of a selecting plate carrying escapement operating pins, a support therefor, a rock-shaft having a tapered end, arms carried by the rock-shaft engaging with said selecting plate, a spring tending to move said rock-shaft endwise, a stepped wedge limiting said endwise movement, the steps upon said wedge being joined by easy inclines, mechanism for moving said wedge the distance of one step every time a temporary spacer is added to the line, and mechanism for positively moving said wedge in the contrary direction back to its initial position whereby said shaft is moved in opposition to its spring back to its initial position.

12. In a machine for assembling and justifying matrix lines, the combination of an assembling rail, a series of solid temporary spacers normally lying behind said rail, which spacers are of less height than the matrices, means for severally moving said temporary spacers forward so that they project over the assembling rail and then backward, a guard rail behind the assembling rail, and mechanism for delivering permanent spaces onto the temporary spacers which have been moved forward over the assembling rail.

13. In matrix assembling and justifying mechanism, the combination of an assembling rail, a guard rail close behind the same, a series of temporary spacers 7 movable backward and forward under said guard rail, means for so moving said temporary spacers, and means for delivering permanent spaces onto the temporary spacers which have been moved forward over the assembling rail.

14. In justifying mechanism, the combination with a spacer magazine, a tube flexibly held beneath the delivery end of said magazine, and a temporary spacer flexibly connected to said tube and located beneath the lower delivery end thereof, said spacer having in its rear end a transverse dove-tailed notch and a fixed dove-tailed guide rail fitted to said dove tailed notch and upon which said spacer may be threaded and moved.

15. In a mechanism for justifying an assembled line of matrices, the combination of a spacer magazine, a tube flexibly held beneath the delivery end of said magazine, a solid temporary spacer flexibly connected with the lower end of said tube and located beneath the lower delivery end thereof, said spacer being shorter than the matrices with which it is to be used and having in its top a groove extending from front to rear.

16. In matrix justifying mechanism, a spacer assembling tube having a solid temporary spacer flexibly connected to its lower end said temporary spacer being less high than the matrices with which it is to be used.

17. In justifying mechanism, the combination of a plurality of spacer magazines having contracted lower discharge ends, downwardly projecting flanges between the discharge ends of said magazines, spacer assembling tubes having rearwardly flared upper ends which lie between and engage with said flanges.

18. In justifying mechanism, a matrix assembling tube having its sides flared outward at its upper end and having a rearwardly extended finger 61.

19. In justifying mechanism, a spacer assembling tube having on its rear side and at its lower end an arm $6^a$, a solid temporary spacer below said tube having the ear $7^a$, and connecting piece 225 which is pivoted to said ear and to said arm by pivots at right angles to each other.

20. In justifying mechanism, the combination of a row of temporary spacers, an abutment for one end of the row, a spacer packing slide bearing against the other end of the row, and means for severally moving the spacers forward out of the row, with a spring-actuated lever for actuating said slide in the packing direction, a stepped wedge, and connections between said stepped wedge and lever.

21. In justifying mechanism, the combination of a row of temporary spacers, an abutment for one end of the row, a spacer packing slide bearing against the other end of the row, and means for severally moving the spacers forward out of the row, with a spring-actuated lever for actuating said slide in the packing direction, a stepped wedge, connections between said stepped wedge and lever, mechanism for drawing backward the spacers which were moved forward, connections between said mechanism and said lever whereby the latter and the stepped wedge are returned to their normal positions.

22. In justifying mechanism, the combination of the slide 9, a rock-shaft for operating it, a stepped wedge, a rocking lever for operating it, a slotted link connected with said lever, and an arm secured to said rock-shaft and projecting into the slot in said link.

23. In justifying mechanism, the combination of a slide movable in a horizontal plane forward and backward and having a dove-tailed front edge, a row of temporary spacers abutting one end of said slide and having transverse dove-tailed notches in their rear ends, a spacer packing slide abutting the other end of said row, a spring-actuated lever engaging with said slide and acting to move it in the packing direction, a stepped wedge, connections between said stepped wedge and lever, means for severally moving the spacers forward out of the row, means for moving them to the left whereby they are threaded onto the front edge of said slide, mechanism for moving the slide backward and forward, connections between said slide operating mechanism and said lever whereby said lever and stepped wedge are returned to their normal positions, and mechanism for moving the spacers to the right on said slide and off the end thereof while the slide is in its rearmost position.

24. In justifying mechanism, the combination of a selecting plate carrying escapement operating pins,—which plate is under the influence of a spring tending to move it endwise,—a stepped wedge limiting said spring introduced movement, a spring-actuated lever which is operatively connected with said stepped wedge, a temporary-spacer packing slide with which said lever engages, a row of temporary spacers against which the spacer packing slide engages, means for moving the temporary spacers severally out of said row, whereby the lever and stepped wedge may be moved in one direction, and mechanism acting upon said lever in opposition to its actuating spring to move it and the stepped wedge in the contrary direction.

25. In justifying mechanism, the combination of a row of temporary spacers, a packing slide engaging therewith, a spring-actuated lever engaging said packing slide, a stepped wedge and mechanism connecting said lever and wedge, a slotted link connected with said lever, a rock-shaft having an arm entering the slot in said link, and mechanism for actuating said rock-shaft.

26. In justifying mechanism, a row of temporary spacers, an abutment for one end of said row, a slide engaging with the other end of said row, means for severally moving the spacers forward out of said row, a spring-actuated lever engaging with and operating said slide, a selecting plate, and mechanism operated by said lever for limiting the movement of the selecting plate in one direction.

27. In justifying mechanism, the combination of a spacer inserting slide, a vertical rock-shaft, an arm transmitting motion from the rock-shaft to said slide, another arm carried by said rock-shaft, a spring pawl pivoted to said arm, a reciprocating slide having a shoulder, a detent restraining said pawl from engagement with said shoulder, a space key, and mechanism set in operation by said space key for withdrawing said detent.

28. In justifying mechanism, the combination of a reciprocating slide 35 having two shoulders 36—37, a vertical rock-shaft, spacer inserting mechanism operated thereby, an arm secured thereto, a spring-actuated pawl carried by said arm, a detent engaging said pawl, a space key, and mechanism operated thereby for withdrawing said detent.

29. In justifying mechanism, the combination of a pivoted trough, a ball therein, a detent for holding the free end of said trough up, a space key, mechanism operated thereby for withdrawing said detent, mechanism for inserting temporary spacers, a detent carried thereby and acting to restrain the movement of said mechanism and lying in the path of said ball whereby the last mentioned detent is withdrawn, and means for automatically restoring said trough to its normal condition.

30. In justifying mechanism, the combination of a plurality of temporary spacers normally standing in a row behind the assembling rail, mechanism for moving said spacers forward one by one, a detent which prevents the operation of said mechanism, a pivoted trough, a ball therein which will strike said detent when the trough drops, means upholding the trough, a space key, and mechanism operated thereby for withdrawing said trough upholding means.

31. In justifying mechanism, the combination of a pivoted trough having the inclined surface 72, spring-actuated means upholding said trough, a space key for withdrawing said means, a vertical rock-shaft having an arm adapted to engage with said inclined surface, spacer inserting means operated by the rock-shaft, means for operating the rock-shaft, a detent restraining the operation of said means, and a ball in the trough for engaging with and withdrawing said detent.

32. In justifying mechanism, the combination of a space key, and limited number of temporary spacers, mechanism whereby one of said spacers is introduced into the line whenever the space key is operated, the escapement operating mechanism of a permanent space magazine, and mechanism whereby when all of said temporary spacers have been introduced into the line said escapement operating mechanism will be operated whenever the space key is operated.

33. In justifying mechanism, the combination of a plurality of temporary spacers, a space key, and mechanism whereby a temporary spacer is introduced into the line whenever the rock-shaft is operated, the escapement operating mechanism of a permanent space magazine, an arm attached to the space key, a lever pivoted upon said arm, and mechanism, which is operated whenever a temporary spacer is introduced into the line, whereby said lever is moved toward and eventually into a position to engage with said escapement operating mechanism when the space key is depressed.

34. In justifying mechanism, the combination of a limited number of temporary spacers, means for moving them into a matrix line, a stepped wedge, a vertically movable bar connected therewith, and mechanism by which said bar is moved step by step whenever one of said temporary spacers is inserted into the line, a bell-crank lever 136, an arm carried by said bar engaging with one arm of said lever, a bar 137 connected with another arm of said lever, a space key, its rock-shaft, an arm connected with said rock-shaft, a lever pivoted to said arm and having a finger with which said bar 137 engages, and the temporary operating rod of a permanent space magazine.

35. In justifying mechanism, the combination of a limited number of temporary spacers, a space key, spacer inserting mechanism, mechanism whereby said spacer inserting mechanism is set in operation by the depression of the space key, a dog which normally occupies a position where it does not interfere with the operations of the spacer inserting mechanism, mechanism by which said dog is moved step by step every time the spacer inserting mechanism is operated toward the position where it will prevent the operation of said mechanism.

36. In justifying mechanism, the combination of temporary spacers, means for severally inserting them into a matrix line, a space key, mechanism which is set in motion by the depression of the space key for operating the spacer inserting means, a detent, and mechanism for moving the same a definite distance whenever a temporary spacer is inserted into the line toward and eventually into a position to prevent the operation of the spacer inserting mechanism when the space key is operated.

37. In justifying mechanism, the combination of a limited number of temporary spacers, a space key, spacer inserting mechanism, mechanism whereby said spacer inserting mechanism is set in operation through the depression of the space key, a detent which normally occupies a position where it does not interfere with the operations of the spacer inserting mechanism, mechanism by which said detent is moved, step by step, every time the spacer inserting mechanism is operated toward the position where it will prevent the operation of said mechanism, escapement operating mechanism of a permanent space magazine, mechanism connected with the space key and normally occupying a position where it cannot operate said escapement operating mechanism, and a device connected with said detent for moving said lever into the range of said escapement operating mechanism.

38. In justifying mechanism, the combination with a row of temporary spacers, means for moving them severally out of the row, a spring-actuated lever whose spring-induced movement is restrained and limited by said row of spacers, a vertically movable slotted bar connected with said lever, an endwise movable bar, a stepped eliminator lever pivoted to said bar and having a pin which is engaged by said slotted bar.

39. In justifying mechanism, the combination with a row of temporary spacers, means for moving them severally out of the row, a spring-actuated lever whose spring-induced movement is restrained and limited by said row of spacers, a vertically movable slotted bar connected with said lever, an endwise movable bar, a stepped eliminator lever pivoted to said bar and having a pin which is engaged by said slotted bar, a detent slide, a block secured thereto, and a lever pivoted to said block for engagement with the steps of said eliminator.

40. In justifying mechanism, the combination of the detent slide having a detent which projects over the assembling rail, a stepped eliminator, an endwise movable bar to which said eliminator is pivoted, a block adjustable upon the detent slide, and a lever pivoted to said block in a position to engage with said eliminator.

41. In justifying mechanism, the combination of the detent slide, a block adjustably secured thereto, and a block section adjustably secured to said block, and a lever pivoted to said block section.

42. In justifying mechanism, the combination of the detent slide, a block adjustably secured thereto and having a serrated upper edge, a block section having a serrated lower edge and a set-screw for securing the block and block section together, and a lever pivoted to said block section.

43. In justifying mechanism, the combination of an assembling rail, a detent slide having a detent which projects over said rail, a line packer, means for moving temporary spacers over said rail as a matrix line is being assembled, means for simultaneously withdrawing all of the spacers from the line, means for simultaneously introducing into the line permanent spaces in lieu of the temporary spacers, and means for moving the detent a short distance away from the front end of the assembled line before the temporary spacers are removed therefrom.

44. In justifying mechanism, the combination of a detent slide having ratchet teeth on its under side, a lever carrying a pawl for engagement with said ratchet teeth, mechanism actuating said lever, and mechanism for substantially drawing said detent slide back to its normal position.

45. In justifying mechanism, the combination of a detent slide, a detent connected therewith by a horizontal transverse tongue and groove connection, mechanism for drawing said detent slide back to its starting point, and mechanism for first moving said detent slide a slight distance forward before it begins its said backward movement.

46. In justifying mechanism, the combination of a selecting plate carrying escapement operating pins, means for positioning said selecting plate, and a vertically movable rod for moving said selecting plate upward, a pivoted fender 93 having an operating arm 95, a spring for rocking said fender in one direction, and an arm secured to the vertically movable rod for operating the fender in the other direction.

47. In justifying mechanism, the combination of the assembling rail, a graduated gage bar movable in a path parallel with said rail, means for inserting temporary spacers into a line of matrices being assembled upon said rail, and mechanism for moving said gage bar, every time a temporary spacer is inserted into the line, a distance equal to the difference between the width of said temporary spacer and the width of an ideal permanent space.

48. In justifying mechanism, the combination of an assembling rail, a graduated slide adjacent to said rail and movable in a path parallel with it, mechanism for moving temporary spacers onto said rail, vertically movable bar 90, and mechanism whereby it is moved step by step, as said temporary spacers are so moved, a rock-shaft having two arms, one of which engages with said graduated bar to move it, and the other engages with said vertically movable rod to be moved by it.

49. In justifying mechanism, the combination of an assembling rail, a graduated slide adjacent to said rail and movable in a path parallel with it, mechanism for moving temporary spacers onto said rail, vertically movable bar 90, and mechanism whereby it is moved step by step, as said temporary spacers are so moved, a rock-shaft, an arm secured to said rock-shaft carrying a crank pin which enters a vertical slot in said graduated bar, another arm secured to said rock-shaft and carrying a crank pin, and an arm secured to the bar 90 and having a slot into which the last named crank pin projects.

50. In justifying mechanism, the combination of a series of spacer magazine channels, their escapement mechanism, a selecting plate carrying escapement operating pins, a vertically movable frame upon which the selecting plate is movably supported, and a yoke secured to said frame and extending over and engaging with levers of the escapement mechanisms.

51. In justifying mechanism, the combination of a row of escapement levers, a selecting plate having pins for operating said levers, a vertically movable frame upon which said selecting plate is movably supported, and a yoke bar connected with said frame and extended over said escapement levers.

52. In justifying mechanism, the combination of escapement levers, a yoke bar extending over all of said levers and engaging with them, and mechanism for moving said yoke bar up and down.

53. In justifying mechanism, the combination of a pallet lever having prongs which project into a spacer magazine channel, and a substantially horizontal tail piece, an operating lever which engages with and locks said pallet lever, and mechanism for moving said operating lever upward to unlock the pallet lever and then to engage with the tail piece to rock it.

54. In justifying mechanism, the combination of a detent slide, a detent, means for moving said detent forward and backward independent of any movement of the detent slide, mechanism for moving said detent slide back to its initial position, a cam shaft, and a cam thereon for operating said mechanism.

55. In justifying mechanism, the combination of means for releasing permanent spaces, means for conveying them and introducing them into a line in lieu of temporary spacers, mechanism for withdrawing temporary spacers from the line a detent slide, mechanism for retracting the detent slide, a cam shaft and cams thereon for operating said mechanisms.

56. In justifying mechanism, the combination of a detent slide, a lever for retracting it, a cam for operating the lever, a line key, and mechanism which is set in operation when said line key is operated for connecting said cam with a source of power.

57. In justifying mechanism, the combination of the vertically movable selecting plate, a vertically movable rod for lifting said plate, a spring for moving said rod down, a cam for moving it up, a line key, and mechanism controlled by said line key for connecting said cam with a rotating driving member.

58. The combination with a normally inactive shaft 150, a clutch connecting it with a source of power, a line key, mechanism controlled by the line key for causing the clutching action of said clutch, a normally inert shaft 187, a clutch for connecting it with a source of power, mechanism operated by shaft 150 for causing the clutching action of the last named clutch.

59. The combination with a normally inactive shaft 150, a clutch connecting it with a source of power, a line key, mechanism controlled by the line key for causing the clutching action of said clutch, a normally inert shaft 187, a clutch for connecting it with a source of power, mechanism operated by shaft 150 for causing the clutching action of the last named clutch, and a device operable at will for rendering the last mentioned mechanism inoperative.

60. The combination with a normally inactive shaft 150, a clutch connecting it with a source of power, a line key, mechanism controlled by the line key for causing the clutching action of said clutch, a normally inert shaft 187, a clutch for connecting it with a source of power, mechanism operated by shaft 150 for causing the clutching action of the last named clutch, and a device operable at will for rendering the last mentioned mechanism inoperative, said device being movable through a path which causes it to engage with and operate the line key.

61. The combination of driving mechanism for various parts of the justifying mechanism, a line key, mechanism controlled thereby for setting said driving mechanism in action, a rock-shaft having an arm which engages with a part of said line key, and another arm by which the rock-shaft may be rocked, the casting mechanism driving shaft, a clutch for connecting the same to a source of power, mechanism, receiving its motion from the driving mechanism of the justifying mechanism, for controlling the action of the casting shaft clutch, and a third arm connected with said rock-shaft for rendering the last named clutch controlling mechanism inactive.

62. In justifying mechanism, the combination of a cam shaft, cams thereon, and mechanism operated by said cams for actuating parts of the justifying mechanism, a rotating ratchet, a spring pawl carried by a disk on said shaft, a lever engaging with the tail of said pawl and holding it out of action, a lever arm connected with said lever, a spring for moving both levers, a slide connected with the last named lever arm and provided with a notch, and a line key having an arm adapted to engage in said notch.

63. In justifying mechanism, the combination of a cam shaft, cams thereon, and mechanism operated by said cams for actuating parts of the justifying mechanism, a rotating ratchet, a spring pawl carried by a disk on said shaft, a lever engaging with the tail of said pawl and holding it out of action, a lever arm connected with said lever, a spring for moving both levers, a slide connected with the last named lever arm and provided with a notch, a line key having an arm attached to engage in said notch, and an arm secured to said lever for engagement with one of said cams whereby said lever, lever arm and slide are moved in opposition to said spring.

64. The combination of a cam shaft carrying a plurality of cams for operating different parts of the justifying mechanism, a transfer slide, and mechanism operated by said cam shaft for moving said transfer slide, a clutch for connecting said cam shaft with a source of power, a line key, mechanism intermediate thereof and the clutch for controlling the action of said clutch, a casting mechanism driving shaft 187, a clutch for connecting it with a source of power, a lever controlling the action of said clutch, and mechanism actuated by the cam shaft operating said lever.

65. The combination of a cam shaft carrying a plurality of cams for operating different parts of the justifying mechanism, a transfer slide, and mechanism operated by said cam shaft for moving said transfer slide, a clutch for connecting said cam shaft with a source of power, a line key, mechanism intermediate thereof and the clutch for controlling the action of said clutch, a casting mechanism driving shaft 187, a clutch for connecting it with a source of power, a lever controlling the action of said clutch, mechanism actuated by the cam shaft for operating said lever, and manually operated mechanism for rendering the last named mechanism inoperative.

66. The combination of casting mechanism driving shaft, a clutch for connecting it with a source of power, a rotatable cam, mechanism intermediate of said cam, and clutch for controlling the operation of the latter, and a manually operative device for rendering the last mentioned mechanism inoperative, a shaft to which said cam is secured, a clutch connecting said cam with a source of power, a line key controlling the action of said clutch which line key has an arm projecting into the path of said manually operated device so as to be operated thereby.

67. The combination of a cam shaft, casting mechanism driving shaft 187, a clutch for connecting said shaft with rotatable mechanism, a pivoted lever controlling the operation of said clutch, a cam on the cam shaft, a bar operated thereby having a pin and slot connection with said bell-crank lever, a pawl carried by said bell-crank lever, a spring normally holding said pawl in the path of the upper end of said bar, a manually operative device for moving said pawl out of the path of said bar, and a spring detent for engaging with said pawl to hold it against the action of its spring.

68. The combination of a cam shaft, casting mechanism driving shaft 187, a clutch for connecting said shaft with rotatable mechanism, a pivoted bell-crank lever controlling the operation of said clutch, a cam on the cam shaft, a bar operated thereby having a pin and slot connection with said bell-crank lever, a pawl carried by said bell-crank lever, a spring normally holding said pawl in the path of the upper end of said bar, a manually operative device for moving said pawl out of the path of said bar, a spring detent for engaging with said pawl to hold it against the action of its spring, said bar having a beveled end adapted to engage with said detent and withdraw it from engagement with said pawl.

69. In mechanism for assembling and justifying matrix lines, a combination of a vertically movable member and mechanism whereby it is moved a definite distance every time a temporary spacer is inserted into the line, another vertically movable member, and mechanism by which it is moved, after the line has reached a predetermined length, distances proportionate to the width of the several matrices thereafter added to the line, an electric signal connected in a normally open circuit, and two circuit closing switch members respectively operated by said two vertically movable members.

70. In mechanism for assembling and justifying matrix lines, a combination of a vertically movable member and mechanism whereby it is moved upward a definite distance every time a temporary space is inserted into the line, another vertically movable member, and mechanism by which it is moved, after the line has reached a predetermined length, distances proportionate to the width of the several matrices thereafter added to the line, two flanges secured respectively to said vertically movable members, two switch levers respectively engaging with said flanges, movable contact points operated by said levers and an electric signal connected in a normally open circuit whose terminals are connected with said contact points.

71. In mechanism for assembling and justifying matrix lines, a combination of a vertically movable member and mechanism whereby it is moved a definite distance every time a temporary space is inserted into the line, another vertically movable member, and mechanism by which it is moved, after the line has reached a predetermined length, distances proportionate to the width of the several matrices thereafter added to the line, two flanges secured respectively to said vertically movable members, two levers engaging respectively with said flanges, insulated contact pins carried by said levers, two binding posts, two springs connected with said binding posts and engaging respectively with said pins, and an electric signal whose terminals are respectively connected with said binding posts.

In testimony whereof, I hereunto affix my signature in the presence of two witnesses.

BENJAMIN F. BELLOWS.

Witnesses:
  H. R. SULLIVAN,
  E. B. GILCHRIST.